(12) United States Patent
Brandstein et al.

(10) Patent No.: US 9,133,355 B2
(45) Date of Patent: Sep. 15, 2015

(54) AQUEOUS INK COMPOSITIONS AND METHOD OF PREPARING SAME

(75) Inventors: Or Brandstein, Haifa (IL); Eytan Cohen, Ra'anana (IL); Ran Vilk, Kiryat Ono (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 8 days.

(21) Appl. No.: 14/008,758

(22) PCT Filed: Mar. 30, 2011

(86) PCT No.: PCT/IL2011/000283
§ 371 (c)(1),
(2), (4) Date: Sep. 30, 2013

(87) PCT Pub. No.: WO2012/131668
PCT Pub. Date: Oct. 4, 2012

(65) Prior Publication Data
US 2014/0015912 A1  Jan. 16, 2014

(51) Int. Cl.
*C09D 11/02* (2014.01)
*C09D 11/30* (2014.01)
*C09D 11/322* (2014.01)

(52) U.S. Cl.
CPC .............. *C09D 11/30* (2013.01); *C09D 11/322* (2013.01)

(58) Field of Classification Search
CPC ........ C09D 11/08; C09D 11/10; C09D 11/30; C09D 11/322
USPC ............ 106/31.27, 31.6, 31.58, 31.86, 31.29, 106/31.61
See application file for complete search history.

(56) References Cited

U.S. PATENT DOCUMENTS

| 5,122,566 | A | 6/1992 | Burroway et al. |
| 5,204,401 | A | 4/1993 | Anderson, Jr. et al. |
| 5,623,001 | A | 4/1997 | Figov |
| 6,848,777 | B2 | 2/2005 | Chen et al. |
| 6,908,186 | B2 | 6/2005 | Zheng et al. |
| 7,176,248 | B2 | 2/2007 | Valentini et al. |
| 7,192,472 | B2 | 3/2007 | Hermansky |
| 7,402,201 | B2 | 7/2008 | Wachi et al. |

(Continued)

FOREIGN PATENT DOCUMENTS

| EP | 0930349 | 7/1999 |
| JP | H1110799 | 1/1999 |

(Continued)

OTHER PUBLICATIONS

Klang et al., New Developments in the Commercialization of UV Curable Inkjet Inks, Sartomer Company, Inc., Bulletin, Aug. 2002, pp. 1-8, Exton PA.

(Continued)

*Primary Examiner* — Veronica F Faison
(74) *Attorney, Agent, or Firm* — North Shore Associates (57) ABSTRACT

An aqueous ink composition includes at least 60% water by weight, an acrylic latex polymer suspension, a polyurethane suspension, a polyethylene wax suspension, and an organic solvent that comprises about 10% to about 30% of the ink composition. In methods for preparing an aqueous ink composition, a combination of the aforementioned components is provided. The combination is subjected to conditions under which the ink composition becomes substantially uniform and then the combination is subjected to filtration.

20 Claims, 1 Drawing Sheet

(56) References Cited

U.S. PATENT DOCUMENTS

| | | |
|---|---|---|
| 7,605,192 B2 | 10/2009 | Sanada et al. |
| 7,677,714 B2 | 3/2010 | Sarkisian et al. |
| 7,690,783 B2 | 4/2010 | Sugai |
| 7,699,924 B2 | 4/2010 | Mafune et al. |
| 7,862,653 B2 | 1/2011 | Sanada et al. |
| 2004/0176530 A1 | 9/2004 | Tielemans et al. |
| 2005/0020730 A1 | 1/2005 | Valentini et al. |
| 2005/0027036 A1 | 2/2005 | Takizawa et al. |
| 2005/0032930 A1 | 2/2005 | Jackson |
| 2007/0105980 A1 | 5/2007 | Yamamoto et al. |
| 2007/0167545 A1* | 7/2007 | Sugerman et al. ............ 524/236 |
| 2007/0252881 A1 | 11/2007 | Sanada et al. |
| 2008/0017067 A1 | 1/2008 | Valentini et al. |
| 2008/0018722 A1 | 1/2008 | Mafune et al. |
| 2008/0118657 A1 | 5/2008 | Taverizatshy et al. |
| 2008/0207820 A1 | 8/2008 | Brust et al. |
| 2009/0221736 A1* | 9/2009 | McCurry ..................... 524/451 |
| 2010/0225707 A1 | 9/2010 | Kudo et al. |
| 2010/0271433 A1 | 10/2010 | Jolly et al. |

FOREIGN PATENT DOCUMENTS

| | | |
|---|---|---|
| JP | 2000219286 | 8/2000 |
| JP | 2006219670 | 8/2006 |
| JP | 2011153180 | 8/2011 |
| JP | 2011231202 | 11/2011 |
| JP | 5146611 | 2/2013 |
| WO | 2004090005 | 10/2004 |
| WO | 2011093486 | 8/2011 |

OTHER PUBLICATIONS

El-Molla, Synthesis and characterization of aqueous UV-curable binder for ink preparation in ink-jet printing and pigment dyeing of fabrics, Indian Journal of Fibre & Textile Research, vol. 32, Mar. 2007, pp. 105-113.

* cited by examiner

AQUEOUS INK COMPOSITIONS AND METHOD OF PREPARING SAME

BACKGROUND

Inkjet printers are now very common and affordable and allow one to obtain decent print quality. They are used in home printing, office printing and commercial printing. The growth of inkjet printing is the result of a number of factors including reductions in cost of inkjet printers and improvements in print resolution and overall print quality. A continued demand in inkjet printing has resulted in the need to produce images of high quality, high permanence and high durability while maintaining a reasonable cost. Inkjet printing is a popular method of non-contact printing on a broad selection of substrates.

A variety of ink types are used in inkjet printing with each type of ink having its advantages and drawbacks. Industrial inkjet printing employs primarily solvent based and UV curable inks jetted typically by piezoelectric inkjet (PIJ) print heads. Solvent inks have good adhesion and printability as well as jetting reliability and printing speed. Solvent inks, however, emit large amounts of volatile organic compounds (VOCs) considered as hazardous air pollutants (HAPS). For the use of solvent inks, installation of special VOC capturing devices and imposition of strict control on the printing site are required. Solvent inks have a low flash point and are easy flammable and therefore, must be dried at relatively low temperatures.

UV inkjet inks enable high printing speed, they have relatively good adhesion on a variety of substrates and they have low VOC content. UV inks, however, are characterized by an unpleasant odor; in addition, such inks are harmful to the environment and may cause skin or eye inflammation. The printed image from the use of UV inks possesses a small rough relief and when printed on a flexible substrate, the inks limit substrate flexibility and stretch/shrink related applications.

Aqueous (water-based) inkjet inks are used primarily in a home or an office environment. A number of commercial inkjet printers use aqueous latex inks such as, for example, HP DESIGNJET® L25500 wide format inkjet printer (Hewlett Packard, Palo Alto Calif.), which uses aqueous latex ink with thermal inkjet (TIJ) technology, and HP SCITEX® FB6700, which is flatbed PIJ printer that uses aqueous latex ink. Aqueous inks have several advantages such as, for example, low viscosity and environmentally friendliness over UV-based and solvent-based inks; the aqueous inks produce a good image quality and span the color gamut.

Drying of aqueous inks requires large amounts of energy. Moreover, as water evaporates, the ink dries in the print head nozzles. Complicated maintenance systems may be necessary to provide continued print head operation. The adhesion of aqueous inks may be limited and printing on plastic substrates has been very difficult, if not perhaps impossible.

BRIEF DESCRIPTION OF THE DRAWINGS

The drawings provided herein are not to scale and are provided for the purpose of facilitating the understanding of certain examples in accordance with the principles described herein and are provided by way of illustration and not limitation on the scope of the appended claims.

DETAILED DESCRIPTION

Examples in accordance with the principles described herein provide aqueous inkjet ink compositions that allow for reliable jetting, very low VOC content, fast drying and curing, an ability to print on plastic and non-plastic media with excellent image quality, good adhesion and film durability. In addition, examples of aqueous inks in accordance with the principles described herein combine positive properties of UV and organic solvent-based inks and overcome many, if not all, of the drawbacks of aqueous inks discussed above.

In some examples in accordance with the principles described herein, an ink composition comprises (a) at least 60% water by weight, (b) an acrylic latex polymer suspension, (c) a polyurethane suspension, (d) a polyethylene wax suspension, and (d) an organic solvent that comprises about 10% to about 30% of the ink composition.

The amount of water in the ink composition is dependent, for example, on the amount of other components of the ink composition. The amount of water in the ink composition includes the amount of water added plus the amount of water in the suspensions and other components of the ink composition. In some examples, the amount of water in the ink composition by weight is at least about 60%, or at least about 65%, or at least about 70%, or at least about 75%, and no more than about 80%, for example. In some examples, the amount of water in the ink composition by weight is in the range of about 60% to about 80%, or about 60% to about 75%, or about 60% to about 70%, or about 60% to about 65%, or about 65% to about 80%, or about 65% to about 75%, or about 65% to about 70%, or about 70% to about 80%, or about 70% to about 75%, or about 75% to about 80%, for example.

As mentioned above, the ink composition in accordance with the principles described herein includes the aforementioned three types of suspensions, namely, an acrylic latex polymer suspension, a polyurethane suspension and a polyethylene wax suspension. The combination of these three polymer suspensions enables optimal balance between the formation speed of an ink film, the durability of the ink film, the reliability of ink jetting and the adhesion of the ink composition to many different types of surfaces including plastic substrates. Blending polymers with different film formation temperatures, such as acrylic latex polymer with higher glass transition temperature Tg than the polyurethane polymer and with lower minimum film formation temperature (MFFT) improves the overall film formation process by having the polyurethane polymer acting as a coalescent agent in the process of latex film formation.

In some examples a blend of acrylic latex polymer suspension, polyurethane suspension and polyethylene wax suspension is selected to obtain an ink composition having a viscosity of about 5 centipoise (cp) to about 15 cp, or about 5 cp to about 12 cp, or about 5 cp to about 10 cp, or about 5 cp to about 8 cp, or about 8 cp to about 15 cp, or about 8 cp to about 12 cp, or about 8 cp to about 10 cp at a dispensation temperature (that is, a temperature at which the ink composition is emitted from an ink dispensing apparatus wherein dispensing may be by jetting, for example) of about 5° C. to about 40° C., or about 5° C. to about 35° C., or about 5° C. to about 30° C., or about 5° C. to about 25° C., or about 5° C. to about 20° C., or about 5° C. to about 15° C., or about 5° C. to about 10° C., or about 10° C. to about 40° C., or about 10° C. to about 35° C., or about 10° C. to about 30° C., or about 10° C. to about 25° C., or about 10° C. to about 20° C., or about 10° C. to about 15° C., or about 15° C. to about 40° C., or about 15° C. to about 35° C., or about 15° C. to about 30° C., or about 15° C. to about 25° C., or about 15° C. to about 20° C., or about 20° C. to about 40° C., or about 20° C. to about 35° C., or about 20° C. to about 30° C., or about 20° C. to about 25° C., or about 25° C. to about 40° C., or about 25° C. to about 35° C., or about 25° C. to about 30° C., or about 30° C. to about 40° C., or about 30° C. to about 35° C., or about 35° C. to about 40° C., for example.

As mentioned above, one of the components of an ink composition in accordance with the principles described herein is an acrylic latex polymer suspension. The term "acrylic latex" includes polymers of acrylic monomers, polymers of methacrylic monomers, and copolymers of the aforementioned monomers with other monomers. The term "suspension" includes emulsions and dispersions, for example. The suspensions comprise a suspension medium and a suspended solid material that is, for example, a particle, that is relatively evenly distributed throughout the suspension medium and that has an average diameter of about 30 nm to about 300 nm, or about 30 nm to about 250 nm, or about 30 nm to about 200 nm, or about 30 nm to about 150 nm, or about 30 nm to about 100 nm, or about 30 nm to about 70 nm, or about 50 nm to about 300 nm, or about 50 nm to about 250 nm, or about 50 nm to about 200 nm, or about 50 nm to about 150 nm, or about 50 nm to about 100 nm, or about 50 nm to about 70 nm, or about 75 nm to about 300 nm, or about 75 nm to about 250 nm, or about 75 nm to about 200 nm, or about 750 nm to about 150 nm, or about 75 nm to about 100 nm, or about 100 nm to about 300 nm, or about 100 nm to about 250 nm, or about 100 nm to about 200 nm, or about 100 nm to about 150 nm, or about 150 nm to about 300 nm, or about 150 nm to about 250 nm, or about 150 nm to about 200 nm, for example. In some examples, the suspension medium is an aqueous medium, which may comprise one or more additional components such as, but not limited to, organic solvents (e.g., glycols, alcohols, glycol ethers, and heterocyclic ketones).

In some examples, the percentage of solids in the acrylic latex polymer suspension is about 10% to about 50%, or about 10% to about 45%, or about 10% to about 40%, or about 10% to about 35%, or about 10% to about 30%, or about 10% to about 25%, or about 10% to about 20%, or about 10% to about 15%, or about 20% to about 50%, or about 20% to about 45%, or about 20% to about 40%, or about 20% to about 35%, or about 20% to about 30%, or about 20% to about 25%, by weight of the acrylic latex polymer suspension. The percentage of solids of the acrylic latex polymer in the suspension is such that the percentage of solids of the acrylic latex polymer in the ink composition is about 1% to about 4%, or about 1% to about 3%, or about 1% to about 2%, or about 2% to about 4%, or about 2% to about 3%, or about 3% to about 4%, for example.

In some examples, the acrylic latex polymer suspension has a glass transition temperature of about 50° C. to about 90° C., or about 50° C. to about 85° C., or about 50° C. to about 80° C., or about 50° C. to about 75° C., or about 50° C. to about 70° C., or about 55° C. to about 90° C., or about 55° C. to about 85° C., or about 55° C. to about 80° C., or about 55° C. to about 75° C., for example.

The acrylic latex polymer is formed from acrylic monomers and thus, may be said to comprise acrylic monomer residues or methacrylic monomer residues. Examples of monomers of the acrylic latex polymer include, by way of illustration and not limitation, acrylic monomers, such as, for example, acrylate esters, acrylamides, and acrylic acids, and methacrylic monomers, such as, for example, methacrylate esters, methacrylamides, and methacrylic acids. The acrylic latex polymer may be a homopolymer or copolymer of an acrylic monomer and another monomer such as, for example, a vinyl aromatic monomer including, but not limited to, styrene, styrene-butadiene, p-chloromethylstyrene, divinyl benzene, vinyl naphthalene and divinyl naphthalene, for example, such that, in some examples in accordance with the principles described herein, the acrylic latex polymer is a predominantly acrylic polymer. By "predominantly acrylic" is meant that the polymer contains greater than about 50%, or greater than about 55%, or greater than about 60%, or greater than about 70%, or greater than about 80%, or greater than about 90%, by weight, of copolymerized units comprising acrylic monomer residues or methacrylic monomer residues, or combinations thereof.

Examples of acrylate monomers include, but are not limited to, methyl acrylate, ethyl acrylate, propyl acrylate, isopropyl acrylate, n-butyl acrylate, iso-butyl acrylate, tert-butyl acrylate, 2-ethylhexyl acrylate, lauryl acrylate, isobornyl acrylate, cyclohexyl acrylate, 3,3,5-trimethylcyclohexyl acrylate, isocane acrylate, glycidyl acrylate, 3,4-epoxycyclohexylmethylacrylate, 2-(3,4-epoxycyclohexyl)ethylacrylate, hydroxyethyl acrylate, hydroxypropyl acrylate, hydroxybutyl acrylate, methacrylic anhydride, diethyleneglycol bisacrylate, 4,4'-isopropylidenediphenolbisacrylate (Bisphenol A diacrylate), alkoxylated 4,4'-isopropylidenediphenol bisacrylate, trimethylolpropane trisacrylate and alkoxylated trimethylolpropane trisacrylate.

Examples of methacrylate monomers include, but are not limited to, methyl methacrylate, ethyl methacrylate, propyl methacrylate, isopropyl methacrylate, n-butyl methacrylate, iso-butyl methacrylate, tert-butyl methacrylate, 2-ethylhexyl methacrylate, lauryl methacrylate, isobornyl methacrylate, cyclohexyl methacrylate, 3,3,5-trimethylcyclohexyl methacrylate, isocane methacrylate, glycidyl methacrylate, 3,4-epoxycyclohexylmethylmethacrylate, 2-(3,4-epoxycyclohexyl)ethylmethacrylate, hydroxyethyl methacrylate, hydroxypropyl methacrylate, hydroxybutyl methacrylate, methacrylic anhydride, diethyleneglycol bismethacrylate, 4,4'-isopropylidenediphenol bismethacrylate (Bisphenol A dimethacrylate), alkoxylated 4,4'-isopropylidenediphenol bismethacrylate, trimethylolpropane trismethacrylate and alkoxylated trimethylolpropane trismethacrylate.

Some examples of particular acrylic latex polymer suspensions in accordance with the principles described herein include, by way of illustration and not limitation, JONCRYL® 537 and JONCRYL® 538 (BASF Corporation, Port Arthur Tex.); CARBOSET® GA-2111, CARBOSET® CR-728, CARBOSET® CR-785, CARBOSET® CR-761, CARBOSET® CR-763, CARBOSET® CR-765, CARBOSET® CR-715, and CARBOSET® GA-4028 (Lubrizol Corporation, Rancho Santa Margarita Calif.); NEOCRYL® A-1110, NEOCRYL® A-1131, NEOCRYL® A-2091, NEOCRYL® A-1127, NEOCRYL® XK-96, and NEOCRYL® XK-14 (DSM NeoResins, Sluisweg, The Netherlands); and BAYHYDROL® AH XP 2754, BAYHYDROL® AH XP 2741, BAYHYDROL® A 2427, and BAYHYDROL® A 2651 (Bayer Material Science, Baytown Tex.), for example, or a combination of two or more of the above.

In some examples, the acrylic latex polymer suspension may contain neutralizing agents that have the purpose of converting at least some of the acid groups on a polymer to a respective salt, which enables stable suspension of polymer particles in water. Examples of neutralizing agents include, but are not limited to, triethylamine (TEA), dimethyl ethanolamine (DMEA), triethanolamine, sodium salt, ammonia, ethyl diisopropyl amine (EDIPA), for example. The neutralizing agent is provided in the acrylic latex polymer suspension in an amount sufficient to accomplish the above purpose.

As mentioned above, one of the components of an ink composition in accordance with the principles described herein is a polyurethane suspension. In some examples in accordance with the principles described herein, the polyurethane polymer has an MFFT of about 20° C. to about 50° C., or about 20° C. to about 45° C., or about 20° C. to about 40° C., or about 20° C. to about 35° C., or about 20° C. to about 30° C., or about 25° C. to about 50° C., or about 25° C. to about 45° C., or about 25° C. to about 40° C., or about 25° C. to about 35° C., or about 25° C. to about 30° C., or about 30° C. to about 50° C., or about 30° C. to about 45° C., or about 30° C. to about 40° C., or about 30° C. to about 35° C., for example.

In some examples the polyurethane suspension is free from organic solvents. Such organic solvents include both polar and non-polar organic solvents. In some examples the polyurethane suspension is free from butyl glycol and pyrrolidones such as, for example, N-methyl-pyrrolidone, N-ethyl-pyrrolidone.

In some examples in accordance with the principles described herein the polyurethane suspension is selected from the group consisting of aliphatic polyurethane dispersions, aromatic polyurethane dispersions, anionic polyurethane dispersions, non-ionic polyurethane dispersions, aliphatic polyester polyurethane dispersions, aliphatic polycarbonate polyurethane dispersions, aliphatic acrylic modified polyurethane dispersions, aromatic polyester polyurethane dispersions, aromatic polycarbonate polyurethane dispersions, aromatic acrylic modified polyurethane dispersions, aromatic polyester polyurethane dispersions, aromatic polycarbonate polyurethane dispersions, and aromatic acrylic modified polyurethane dispersions, for example, or a combination of two or more of the above.

In some examples, the polyurethane suspension may contain neutralizing agents that have the purpose of converting at least some of the acid groups on a polymer to a respective salt, which enables a stable suspension of polymer particles in water. Examples of neutralizing agents include, but are not limited to, triethylamine (TEA), dimethyl ethanolamine (DMEA), triethanolamine, sodium salt, ammonia, ethyl diisopropyl amine (EDIPA), for example. The neutralizing agent is provided in the polyurethane suspension in an amount sufficient to accomplish the above purpose.

In some examples, the percentage of solids in the polyurethane suspension is about 10% to about 50%, or about 10% to about 45%, or about 10% to about 40%, or about 10% to about 35%, or about 10% to about 30%, or about 10% to about 25%, or about 10% to about 20%, or about 10% to about 15%, or about 20% to about 50%, or about 20% to about 45%, or about 20% to about 40%, or about 20% to about 35%, or about 20% to about 30%, or about 20% to about 25%, by weight of the polyurethane suspension. In some examples in accordance with the principles described herein, the percentage of solids of the polyurethane in the suspension is such that the percentage of solids of the polyurethane in the ink composition is about 2% to about 10%, or about 2% to about 8%, or about 2% to about 6%, or about 2% to about 4%, or about 2% to about 3%, or about 3% to about 10%, or about 3% to about 8%, or about 3% to about 6%, or about 3% to about 4%, or about 4% to about 10%, or about 4% to about 8%, or about 4% to about 6%, or about 4% to about 5%, for example.

Some examples of particular polyurethane suspensions in accordance with the principles described herein include, by way of illustration and not limitation, NEOREZ® R-989, NEOREZ® R-2005, and NEOREZ® R-4000 (DSM NeoResins); BAYHYDROL® UH 2606, BAYHYDROL® UH XP 2719, BAYHYDROL® UH XP 2648, and BAYHYDROL® UA XP 2631 (Bayer Material Science); DAOTAN® VTW 1262/35WA, DAOTAN® VTW 1265/36WA, DAOTAN® VTW 1267/36WA, DAOTAN® VTW 6421/42WA, DAOTAN® VTW 6462/36WA (Cytec Engineered Materials Inc., Anaheim Calif.); and SANCURE® 2715, SANCURE® 20041, SANCURE® 2725 (Lubrizol Corporation), for example, or a combination of two or more of the above.

As mentioned above, one of the components of an ink composition in accordance with the principles described herein is a polyethylene wax suspension. The polyethylene wax suspension may be non ionic, anionic or cationic stabilized. In some examples in accordance with the principles described herein, the polyethylene wax suspension is selected from the group consisting of low density polyethylene (LDPE) wax emulsions, high density polyethylene (HDPE) wax emulsions, oxidized polyethylene wax emulsions, ethylene copolymer wax emulsions, and polyethylene copolymer wax emulsions, for example, or a combination of two or more of the above.

Some examples of particular polyethylene wax suspensions in accordance with the principles described herein include, by way of illustration and not limitation, POLIGEN® WE1, POLIGEN® WE3, POLIGEN® WE4, POLIGEN® WE6, POLIGEN® WE7, and POLIGEN® WE9 (all from BASF Corporation); LAKEWAX® 29, LAKEWAX® 37, and LAKEWAX® 20 (all from Lakeland laboratories Limited, Manchester, England); MIDCHEM® 93235 and MIDCHEM® lube 190 (both available from Michelman, Cincinnati Ohio); and API®-188 (Advanced Polymers Inc., Salem N.H.); for example, or a combination or two or more of the above.

In some examples, the percentage of solids in the polyethylene wax suspension is about 10% to about 50%, or about 10% to about 45%, or about 10% to about 40%, or about 10% to about 35%, or about 10% to about 30%, or about 10% to about 25%, or about 10% to about 20%, or about 10% to about 15%, or about 20% to about 50%, or about 20% to about 45%, or about 20% to about 40%, or about 20% to about 35%, or about 20% to about 30%, or about 20% to about 25%, by weight of the polyethylene wax suspension. The percentage of solids of the polyethylene wax in the suspension is such that the percentage of solids of the polyethylene wax in the ink composition is about 0.1% to about 2%, or about 0.1% to about 1.5%, or about 0.1% to about 1%, or about 0.1% to about 0.5%, or about 0.2% to about 2%, or about 0.2% to about 1.5%, or about 0.2% to about 1%, or about 0.2% to about 0.5%, or about 0.5% to about 2%, or about 0.5% to about 1.5%, or about 0.5% to about 1%, or about 1% to about 2%, for example.

In some examples in accordance with the principles described herein, the solids in the respective suspensions of the ink compositions, by way of illustration and not limitation, have a ratio represented as acrylic latex polymer suspension:polyurethane suspension:polyethylene wax suspension, of about 2 to about 3:about 1:about 0.3 to about 0.5, for example, with some examples being, but not limited to, about 2:about 1:about 0.5 or about 3:about 1:about 0.3, for example.

As mentioned above, an ink composition in accordance with the principles described comprises an organic solvent. The organic solvent is soluble (water soluble) or miscible in water (water miscible). The nature of the organic solvent is dependent, for example, on the evaporation qualities or volatility of the organic solvent. Considerations for the volatility of the organic solvent include, for example, optimization of a film forming process, the jetting reliability of the ink composition comprising the organic solvent, and maintaining a low VOC content of the ink composition, for example. A single organic solvent may be employed or a combination of two or more organic solvents may be used.

In some examples, the organic solvent is a polar organic solvent having carbon atoms and heteroatoms. For example, the organic solvent may have about 2 to about 50 carbon atoms, or about 2 to about 40 carbon atoms, or about 2 to about 30 carbon atoms, or about 2 to about 20 carbon atoms, or about 2 to about 10 carbon atoms, or about 5 to about 50 carbon atoms, or about 5 to about 40 carbon atoms, or about 5 to about 30 carbon atoms, or about 5 to about 20 carbon atoms, or about 5 to about 10 carbon atoms, or about 10 to about 50 carbon atoms, or about 10 to about 40 carbon atoms, or about 10 to about 30 carbon atoms, or about 10 to about 20 carbon atoms, or about 10 to about 15 carbon atoms. In addition, the organic solvent may have 1 to about 20 heteroatoms, or about 1 to about 15 heteroatoms, or about 1 to about 10 heteroatoms, or about 1 to about 5 heteroatoms, or about 2 to about 20 heteroatoms, or about 2 to about 15 heteroatoms, or about 2 to about 10 heteroatoms, or about 2 to about 5 heteroatoms, or about 3 to about 20 heteroatoms, or about 3 to about 15 heteroatoms, or about 3 to about 10 heteroatoms, or about 3 to about 5 heteroatoms, or about 4 to about 20 heteroatoms, or about 4 to about 15 heteroatoms, or about 4 to about 10 heteroatoms, or about 4 to about 5 heteroatoms, or about 5 to about 20 heteroatoms, or about 5 to about 15 heteroatoms, or about 5 to about 10 heteroatoms, for example. The heteroatoms may be in the form of one or more alcohol moieties, ether moieties, ketone moieties, aldehyde moieties, amine moieties, and amide moieties, for example.

In some examples the organic solvent has a boiling point of about 170° C. to about 250° C., or about 170° C. to about 240° C., or about 170° C. to about 230° C., or about 170° C. to about 220° C., or about 170° C. to about 210° C., or about 170° C. to about 200° C., or about 170° C. to about 190° C., or about 170° C. to about 180° C., or about 180° C. to about 250° C., or about 180° C. to about 240° C., or about 180° C. to about 230° C., or about 180° C. to about 220° C., or about 180° C. to about 210° C., or about 180° C. to about 200° C., or about 180° C. to about 190° C., or about 190° C. to about 250° C., or about 190° C. to about 240° C., or about 190° C. to about 230° C., or about 190° C. to about 220° C., or about 190° C. to about 210° C., or about 190° C. to about 200° C., or about 200° C. to about 250° C., or about 200° C. to about 240° C., or about 200° C. to about 230° C., or about 200° C. to about 220° C., or about 200° C. to about 210° C., for example.

In some examples the organic solvent is, by way of illustration and not limitation, an alcohol (for example, methanol, ethanol, propanol, isopropanol, butanol, isobutanol, sec-butanol, t-butanol, pentanol, hexanol, cyclohexanol or benzyl alcohol); a polyhydric alcohol (for example, ethylene glycol, diethylene glycol, triethylene glycol, polyethylene glycol, propylene glycol, dipropylene glycol, polypropylene glycol, butylene glycol, hexanediol, pentanediol, glycerol, hexanetriol, or thiodiglycol); a glycol derivative such as, e.g., an ether or an ester (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether or ethylene glycol monophenyl ether); an amine (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine or tetramethylpropylenediamine); an amide (for example, formamide, N,N-dimethylformamide, or N,N-dimethylacetamide); and other organic solvents such as, for example, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile or acetone. The above-mentioned organic solvents can be used in combination of two or more thereof.

In some examples in accordance with the principles described herein, the organic solvent is a glycol, a glycol ether, an alcohol, or a heterocyclic ketone, or a combination of two or more of the above.

An amount of the organic solvent in the ink composition is dependent on a number of factors such as, for example, optimization of a film forming process, jetting reliability of the ink composition comprising the organic solvent, and maintaining a low VOC content of the ink composition. In some examples in accordance with the principles described herein, the amount of organic solvent in the ink composition is about 10% to about 30%, or about 10% to about 25%, or about 10% to about 20%, or about 10% to about 15%, or about 15% to about 30%, or about 15% to about 25%, or about 15% to about 20%, or about 20% to about 30%, or about 20% to about 25%, or about 25% to about 30%, by weight of the ink composition, for example.

Some examples of particular organic solvents in accordance with the principles described herein include, by way of illustration and not limitation, glycol ether solvents, for example, tripropylene glycol monomethyl ether (DOWANOL® TPM), dipropylene glycol ether (DOWANOL® DPG), dipropylene glycol dimethyl ether (PROGLYDE® DMM) (all available from Dow Chemical Company, Midland Mich.), for example.

An ink composition in accordance with the principles described may further comprise a humectant. Considerations regarding the humectant include, but are not limited to, reduction or elimination of nozzle clogging, for example. In some examples, the amount of humectant in the ink composition is that which is effective to address the above considerations.

An ink composition in accordance with the present disclosure may further comprise one or more other components such as, but not limited to, colorants, pigments, and additives affecting various properties of the ink composition, for example.

As mentioned above, the ink compositions may comprise one or more pigments or dyes as colorants. In some examples, insoluble pigment colorants assist in achieving a better image performance. The pigment particulates can be self-dispersed pigments, polymer-coated pigments, or common pigments such as milled pigments, for example. A separate dispersing agent may be used to enable appropriate suspension of the pigment in the ink composition. The particulate pigment may be inorganic or organic. In some embodiments, the pigment of the ink composition is a pigment coated with or encapsulated in an organic polymer. The pigment may be a naturally-occurring pigment or a synthetic pigment. The pigment can be of any color including, but not limited to, black, blue, brown, cyan, green, white, violet, magenta, red, orange and yellow, as well as spot colors from mixtures thereof.

The particulate pigment may be a single particulate pigment or a mixture of two or more particulate pigments. Thus, there may be at least one particulate pigment or at least two particulate pigments or at least three particulate pigments, for example. The number of pigments in a mixture of pigments that comprise the particulate pigment is in the range of 2 to about 5, or 2 to about 4, or 2 to about 3.

Examples of organic pigments that may be present in the ink composition include, by way of illustration and not limitation, perylenes, phthalocyanine pigments (for example, phthalo green, phthalo blue), cyanine pigments (Cy3, Cy5, and Cy7), naphthalocyanine pigments, nitroso pigments, monoazo pigments, diazo pigments, diazo condensation pigments, basic dye pigments, alkali blue pigments, blue lake pigments, phloxin pigments, quinacridone pigments, lake pigments of acid yellow 1 and 3, isoindolinone pigments, dioxazine pigments, carbazole dioxazine violet pigments, alizarine lake pigments, vat pigments, phthaloxy amine pigments, carmine lake pigments, tetrachloroisoindolinone pigments, perinone pigments, thioindigo pigments, anthraquinone pigments and quinophthalone pigments, for example, and mixtures of two or more of the above and derivatives of the above.

Inorganic pigments that may be present in the pigment dispersion, include, for example, metal oxides (for example, titanium dioxide, electrically conductive titanium dioxide, iron oxides (e.g., red iron oxide, yellow iron oxide, black iron oxide and transparent iron oxides), aluminum oxides, silicon oxides), carbon black pigments (e.g., furnace blacks), metal sulfides, metal chlorides, and mixtures of two or more thereof.

Particular examples of pigment colorants that may be employed include, by way of illustration and not limitation, yellow pigments having the following Yellow Pigment color index PY 83, PY 151, PY 150, PY 155, PY 139, PY120, PY180, PY 129 and PY 154, PY213. Magenta pigments composed of Red pigment having color indices of PR 202, PR 254, PR 122, PR149, PR185, PR255, PR146 and Violet pigment having color indices of PV 19, PV 23, PV37 and PV 29 also may be used. Blue pigments having color indices of PB 15:3, PB 15:4, PB15:2, and PB15:1, as well as black pigments having color indices of PBL Black 7 also may be utilized. Inorganic pigment such as a white pigment of the type TiO2 also may be used. Orange pigment having color indices of PO46, PO64, PO34 as well as green pigments having color index of PG7 also may be employed.

The amount of the particulate pigment in the ink composition depends on a number of factors, for example, the nature of the pigment, the nature of the use of the ink composition, the nature of the jetting mechanism for the ink, and the nature of any additives, for example. The ink composition may contain up to 20% by weight of pigment. In some embodiments the amount (percent by weight) of particulate pigment in the ink composition is about 0.1% to about 20%, or about 0.1% to about 15%, or about 0.1% to about 10%, or about 0.1% to about 5%, or about 0.5% to about 20%, or about 0.5% to about 15%, or about 0.5% to about 10%, or about 0.5% to about 5%, or about 1% to about 20%, or about 1% to about 15%, or about 1% to about 10%, or about 1% to about 5%, or about 2% to about 20%, or about 2% to about 15%, or about 2% to about 10%, or about 2% to about 5%, or about 3% to about 20%, or about 3% to about 15%, or about 3% to about 10%, or about 3% to about 5%, or about 5% to about 20%, or about 5% to about 15%, or about 5% to about 10%, for example. The amount of pigment present in the ink composition may range between any combinations of these values, inclusive of the recited values.

Other components that may be present in an ink composition in accordance with the principles described herein are additives affecting various properties of the ink composition. The additives include, but are not limited to, one or more of surfactants or wetting agents (e.g., surfactants containing silicone compounds or fluorinated compounds), dispersing agents, UV stabilizers, rheology modifiers, biocides, slip components, leveling agents, preservatives, anti-molding agents, anti-foaming agents, and stabilizers such as, e.g., storage stability enhancing agents, for example. The total amount by weight of additives in the ink composition is about 0.1% to about 1%, or about 0.1% to about 0.5%, or about 0.1% to about 0.2%, or about 0.2% to about 1%, or about 0.2% to about 0.5%, or about 0.5% to about 1%, for example.

Surfactants include, for example, anionic surfactants such as, for example, sodium dodecylsulfate, sodium dodecyloxysulfonate and sodium alkylbenzenesulfonate; cationic surfactants such as, for example, cetylpyridinium chloride, trimethylcetylammonium chloride and tetrabutylammonium chloride; and nonionic surfactants such as, for example, polyoxyethylene nonylphenyl ether, polyoxyethylene naphthyl ether and polyoxyethylene octylphenyl ether. Other surfactants include, but are not limited to, amphoteric surfactants, silicon-free surfactants, fluorosurfactants, and polysiloxanes, for example. More specific examples of surfactants are those available commercially such as, but not limited to, WET® 500, WET® 510, GLIDE® 100, GLIDE® 450, GLIDE® 450 and GLIDE® 410 (all available from Evonik Tego Chemie Service GmbH, Essen, Germany); BYK® 307, BYK® 308, BYK® 333, BYK® 341, BYK® 346, BYK® 347, BYK® 348, BYK® 349 (available from BYK Chemie GmbH, Wesel, Germany); DYNAX® 4000 and DYNAX® 4010 (both available from Dynax Corp., Pound Ridge N.Y.); 3M NOVEC® FC 4430, 3M NOVEC® FC 4432 and 3M NOVEC® FC 4434 (all available from 3M Energy and Advanced Materials Division, St. Paul Minn.); and ZONYL® FSO (DuPont de Nemours & Company, Wilmington Del.), for example.

Specific examples of leveling agents that are commercially available include, but are not limited to, FLOW® 425, GLIDE® 406, and GLIDE® 440 (Tego Chemie Service GmbH); SURFYNOL® 104PG50, SURFYNOL® 104, SURFYNOL® SE, SURFYNOL® MD30, SURFYNOL® CT-121, SURFYNOL® CT-141, and SURFYNOL® CT-151 (all available from Air Products and Chemicals, Inc., Allentown Pa.); ZONYL® FSO, ZONYL® FSP, or ZONYL® FS-62 (DuPont de Nemours & Company), for example.

Specific examples of anti-foaming agents that are commercially available include, but are not limited to, FOAMEX® 800, FOAMEX® 805, FOAMEX® 845, FOAMEX® 842, FOAMEX® 835, (all available from Evonik Tego Chemie Service GmbH) and TWIN® 4000 (Evonik Tego Chemie Service GmbH); BYK® 019, BYK® 028, BYK® 029 (available from BYK Chemie GmbH); and SURFYNOL® 104PG50, SURFYNOL® MD30 (all available from Air Products and Chemicals, Inc.), for example.

Examples of dispersants include high molecular weight copolymers with groups having an affinity for a pigment. Specific examples of dispersants include those commercially available from BYK Chemie GmbH under the names BYK® 348, BYK®-345, BYK®-346, BYK®-347, BYK® 301, BYK® 302, BYK® 308, BYK®-024, BYK®-023, BYK®-036, and BYK®-080.

Examples of rheology modifiers include, but are not limited to, ACRYSOL® RM-5000 and ACRYSOL® RM-825 (Rohm & Haas, a wholly owned subsidiary of Dow Chemical Company); BORCHIGEL® L75N, BORCHIGEL® L0625, and BORCHIGEL® L W44 (all available from OMG Borchers GmbH, Langenfield, Germany) BYK® 428 and BYK® 429 (both available from BYK Chemie GmbH); and DSX® R2000 E, DSX® R3000 E, and DSX® R3075E (all available from Cognis GmbH, Monheim am Rhein, Germany), for example.

Some examples in accordance with the principles described herein relate to methods of preparing an ink composition. In the methods, a combination is provided, which comprises water, an acrylic latex polymer suspension, a polyurethane suspension, a polyethylene wax suspension, and an organic solvent that comprises about 10% to about 30% of the ink composition. The amount of water in the combination is greater than about 60% by weight of the combination. The combination is subjected to conditions under which the ink composition becomes substantially uniform and then the combination is subjected to filtration.

In some examples, conditions for rendering the ink composition to a substantially uniform dispersion include, for example, agitation such as, e.g., one or more of mixing, stirring, shaking, homogenizing, sonication, ultrasonication, microfluidization, bead milling, and blending, for example, or a combination of the above. In some examples the temperature during the above procedure may be, for example, about 10° C. to about 40° C., or about 10° C. to about 30° C., or about 10° C. to about 20° C., or about 15° C. to about 40° C., or about 15° C. to about 30° C., or about 15° C. to about 20° C., or about 20° C. to about 40° C., or about 20° C. to about 30° C. In some examples the temperature is ambient temperature. The duration of the above treatment may be, for example, about 0.5 hours to about 5 hours, or about 0.5 hours to about 3 hours, or about 0.5 hours to about 2 hours, or about 0.5 hours to 1 hour, or about 1 hour to about 5 hours, or about 1 hour to about 3 hours, or about 1 hour to about 2 hours. The phrase "substantially uniform" means that there is no visible phase separation and that the ink composition applied by draw down results in a uniform film without visible defects such as de-wetting, clustering, or air bubbles, for example.

The ink composition may be filtered to remove large particles that may prohibit reliable jetting. These particles may come from one or more of the pigment dispersions, latex suspensions, polyurethane suspensions, and polyethylene wax suspensions, and one or more of contamination of the organic solvents, water and additives used. Filtration may be carried out using, by way of illustration and not limitation, one or more of membrane filtration, surface filtration, depth filtration, screen filtration, and filtration aid, for example.

In some examples in accordance with the principles described herein, the ink compositions find use as inkjet inks for inkjet printers. In some examples the ink compositions may be dispensed to the surface of a broad range of substrates employing inkjet technology and equipment. The substrate may be planar, either smooth or rough, or such other shape that is suitable for the particular purpose for which it is employed. The substrate may be porous or non-porous, rigid, semi-rigid, or flexible, for example. Planar substrates may be in the form, for example, of a film, plate, board, or sheet by way of illustration and not limitation. Examples of substrate materials include, but are not limited to, plastic substrates (for example, cellulose diacetate, cellulose triacetate, cellulose propionate, cellulose butyrate, cellulose acetate butyrate, nitrocellulose, polyethylene terephthalate, polyethylene, polystyrene, polypropylene, polycarbonate, polyvinyl acetal, and acrylic), paper, paper laminated with plastic (for example, polyethylene, polypropylene, or polystyrene), cardboard, paperboard, foam board, and textiles, for example.

In some examples in accordance with the principles described herein, the substrate has a thickness of about 0.1 mm to about 10 mm, or about 0.1 mm to about 5 mm, or about 0.1 mm to about 1 mm, or about 0.1 mm to about 0.6 mm, or about 0.5 mm to about 10 mm, or about 0.5 mm to about 5 mm, or about 0.5 mm to about 1 mm, or about 0.5 mm to about 0.6 mm, or about 1 mm to about 10 mm, or about 1 mm to about 5 mm, or about 1 mm to about 2 mm, for example.

For inkjet printing the ink composition is heated or chilled to an appropriate dispensation temperature such as, for example, dispensation temperatures mentioned above, prior to ejecting the ink composition to the surface of a substrate. The particular temperature and viscosity of the ink composition is dependent on, for example, the particular method and equipment for conducting the ink jet printing. Considerations regarding temperature and viscosity of the ink composition relate to the effect on droplet size and droplet ejecting rate, for example. In some examples the temperature is maintained relatively constant, which means that the temperature variation is controlled so that there is no more than a variation of ±1° C., or ±0.5° C., or ±0.2° C., or ±0.1° C., for example. Temperature control is achieved with appropriate temperature sensors, for example.

Examples of ink compositions in accordance with the principles described herein may be dispensed from any piezoelectric, drop-on-demand inkjet printing device and many such devices are commercially available. Such inkjet printing devices are available from Hewlett-Packard, Inc., Palo Alto, Calif., by way of illustration and not limitation. In inkjet printing, liquid ink drops are applied in a controlled fashion to an ink-receiving substrate by ejecting ink droplets from plurality of nozzles, or orifices, in a print head of an ink jet printing device or inkjet printer. In drop-on-demand systems, a droplet of ink is ejected from an orifice directly to a position on the surface of an ink receiving substrate by pressure created by, for example, a piezoelectric device, an acoustic device, or a thermal process controlled in accordance digital data signals. An ink droplet is not generated and ejected through the orifices of the print head unless it is needed. The volume of the ejected ink drop is controlled mainly with the print head.

The temperature of a substrate during the printing process may be in the range of about 25° C. to about 90° C., or about 25° C. to about 70° C., or 25° C. to about 50° C., about 35° C. to about 90° C., or about 35° C. to about 70° C., or 35° C. to about 50° C., or about 35° C. to about 65° C., or about 40° C. to about 70° C., or about 55° C. to about 65° C., for example.

Figure 1:
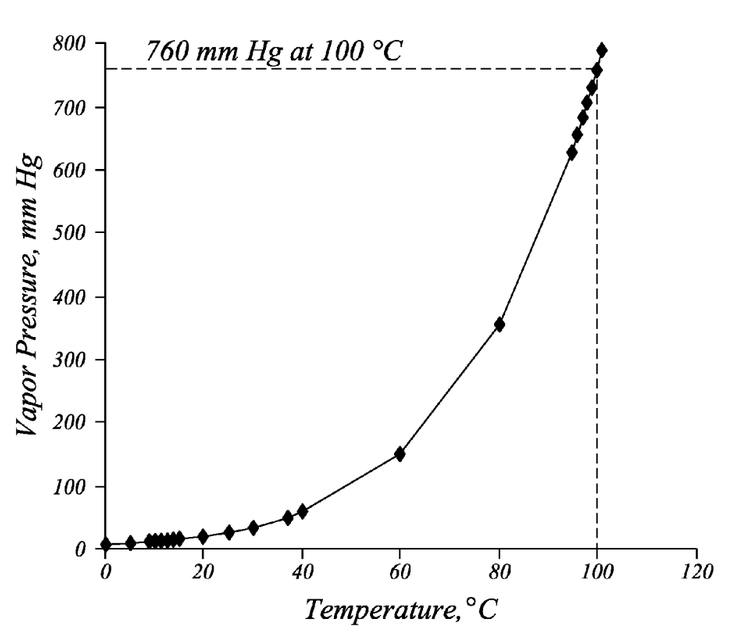
FIG. 1 is a graph illustrating the correlation between water vapor pressure and ink temperature for an example of an ink composition in accordance with the principles described herein.

In a particular example of inkjet printing employing ink compositions in accordance with the principles described herein, the inkjet printing method and system employs a piezoelectric print head and a jetting temperature of about 5° C. to about 15° C. with the ink compositions. By controlling the ink temperature, the dependency of the ink working point on the environmental conditions is reduced or eliminated. The system becomes more stable and easier to use. Reduction of ink jetting temperature causes reduction of the vapor pressure of the water in the ink composition. Lower water vapor pressure means lower water evaporation rate. FIG. 1 is a graph illustrating the correlation between water vapor pressure and ink temperature of the ink composition in an example in accordance with the principles described herein. Since the ink composition contains large amount of water, by decreasing the ink temperature to 15° C. or lower, the ink jetting reliability increases considerably and the ink composition becomes more user friendly. Such ink composition examples according to the principles described herein may have jetting reliability comparable to other water-based inks working in 25° C. while having much faster drying rate on the substrate and allowing minimal addition solvents (VOC), for example.

The present printed or jetted ink may be dried after jetting the ink composition in a predetermined pattern onto the substrate. The drying stage may be conducted, by way of illustration and not limitation, by hot air, electrical heater or light irradiation (e.g., IR lamps), or a combination of such drying methods. In order to achieve a targeted performance level it is advisable to dry the ink at a maximum temperature allowable by the substrate that enables good image quality without substrate deformation. The temperature used for drying should be selected taking into consideration that fact that various plastic substrate materials tend to bend and deform at elevated temperatures. Consequently, the substrate deformation temperature should not be exceeded while drying. Examples of a temperature during drying include about 40° C. to about 150° C., or about 40° C. to about 125° C., or about 40° C. to about 100° C., or about 40° C. to about 80° C., or about 40° C. to about 70° C., or about 40° C. to about 50° C., for example. The ink composition according to the principles herein enables printing on rigid plastic materials while drying at relatively low temperatures of about 40° C. to about 70° C., or about 40° C. to about 60° C., or about 40° C. to about 50° C., or about 50° C. to about 70° C., or about 50° C. to about 60° C., for example, and while achieving fast drying time and good image quality.

In some examples in accordance with the principles described herein, an ink-receiver layer may be applied to certain substrates in a pretreatment stage prior to jetting the image in order to get the required image quality. The ink-receiving layer may be applied in a pretreatment stage digitally by applying the ink-receiver layer with PIJ print heads, or the ink-receiving layer may be applied in the pretreatment stage by analog methods such as spray gun or roller coater, for example. The ink receiver layer serves as a fixer for the ink composition dispensed to the surface of a substrate in part preventing movement of ink droplets on the substrate, where the movement may result in negative image quality effects.

DEFINITIONS

The following provides definitions for terms and phrases used above, which were not previously defined.

The phrase "at least" as used herein means that the number of specified items may be equal to or greater than the number recited. The phrase "about" as used herein means that the number recited may differ by plus or minus 10%; for example, "about 5" means a range of 4.5 to 5.5. The term "between" when used in conjunction with two numbers such as, for example, "between about 2 and about 50" includes both of the numbers recited.

Numerical values, such as ratios, amounts, temperatures and time periods, for example, may be presented herein in a range format. It is to be understood that such range format is used merely for convenience and brevity and should be interpreted to include not only the numerical values explicitly recited as the limits of the range, but also to include all the individual numerical values or sub-ranges encompassed within that range as if each numerical value and sub-range is explicitly recited.

As used herein, the singular forms "a", "an" and "the" include plural referents unless the content clearly dictates otherwise. In some instances, "a" or "an" as used herein means "at least one" or "one or more." Designations such as "first" and "second" are used solely for the purpose of differentiating between two items such as "first polymer" and "second polymer" and are not meant to imply any sequence or order or importance to one item over another or any order of operation, for example.

The term "heteroatom" as used herein means nitrogen, oxygen, phosphorus or sulfur. The term "heterocyclic" means having an alicyclic or aromatic ring structure, which includes one or more heteroatoms.

The term "aromatic" as used herein includes monocyclic rings, bicyclic ring systems, and polycyclic ring systems, in which the monocyclic ring, or at least a portion of the bicyclic ring system or polycyclic ring system, is aromatic (exhibits, e.g., π-conjugation). The monocyclic rings, bicyclic ring systems, and polycyclic ring systems of the aromatic ring systems may include carbocyclic rings and/or heterocyclic rings. The term "carbocyclic ring" denotes a ring in which each ring atom is carbon. The term "heterocyclic ring" denotes a ring in which at least one ring atom is not carbon and comprises 1 to 4 heteroatoms.

EXAMPLES

The following examples are by way of illustration and not limitation on the scope of the principles described herein and the appended claims. Numerous modifications and alternative compositions, methods, and systems may be devised without departing from the spirit and scope of the present disclosure. Unless otherwise indicated, materials in the experiments below may be purchased from Aldrich Chemical Company, St. Louis Mo. Parts and percentages are by weight unless indicated otherwise.

Abrasion Testing Procedure—A Wallace Rubproofness tester (Wallace Instruments, Redhill, United Kingdom) with 2 lb weights was used in ink abrasion tests. Fifty-millimeter (500 mm) diameter circular samples were cut out from the printed sample. The circular samples were attached to the Wallace Rubproofness tester so that the ink side was facing the abrasion paper. The circular sample was rotated against a 115 mm diameter abrasion paper under constant pressure. The abrasion paper used in the testing was MELLOTEX® brilliant white grade paper (Davies Harvey & Murrell, Ltd., Essex, United Kingdom). The abrasion results were assessed by measurement of optical density changes within the tested sample.

Adhesion Testing Procedure—Adhesion testing was performed according to ASTM 3359 "Measuring Adhesion by Tape Test." Cuts were made to the printed sample by a cross hatch cutter such as ELCOMETER® 1542 Cross Hatch Adhesion Tester (Elcometer Inc., Rochester Hills, Mich.). Adhesive tape, 3M SCOTCH® tape 250, was placed and smoothed over the cut area. The tape was removed rapidly in one movement and the cut area was inspected. The results were reported according to the removal of ink from the substrate. If no ink was removed, the result was graded 5, if more than 65% of the ink was removed, the result was graded 0.

Example 1

An ink composition was prepared according to the principles described herein. The ink composition had the composition set forth in Table 1. The total amount (percent by weight) of water in the composition was the amount of water added plus the amount of water from the reagents as supplied by the vendor.

TABLE 1

| Trade name or Abbreviation | Percent by weight (as supplied) | Identity | Percent active substance by weight |
|---|---|---|---|
| Water | 52.2% | | 65.72% |
| DOWANOL® TPM | 5% | Organic solvent | 100% |
| DOWANOL® DPG | 17% | Organic solvent | 100% |
| PROGLYDE® DMM | 3% | Organic solvent | 100% |
| JONCRYL® 538 | 4% | Acrylic latex dispersion | 45% (in water) |
| NEOREZ® R-989 | 10% | Polyurethane dispersion | 40% (in water) |

TABLE 1-continued

| Trade name or Abbreviation | Percent by weight (as supplied) | Identity | Percent active substance by weight |
|---|---|---|---|
| POLIGEN ® WE1 | 2% | Polyethylene wax emulsion | 35% (in water) |
| ACRYSOL ® RM-5000 | 1% | Rheology modifier | 18% (in water) |
| BYK ® 348 | 0.5% | Surfactant | 100% |
| SURFYNOL ® 104PG 50 | 0.3% | Defoamer | 100% |
| UNISPERSE ® Black B-PI | 5% | Pigment | 33% (in water) |

The ink ingredients of the ink composition were mixed for 1 hour by a DISPERMAT® mixer (Byk USA, Inc., Wallingford Conn.) until a uniform dispersion was achieved. The dispersion was filtered through a 1.2 micron absolute membrane filter. A HAAKE® RS-600 rheometer (Thermo Electron, Newington N.H.) was used to measure ink viscosity, which was about 10 cp at 20° C. Ink surface tension as measured by a LAUDA® tensiometer (LAUDA Brinkmann LP, Delran N.J.) was about 28 dyne/cm at room temperature.

The ink composition was jetted by a RICOH® E3 Piezo print head (Ricoh Printing Systems America, Simi Valley Calif.) onto the following substrates: AVERY® MPI 1005 vinyl (Avery Dennison, Painesville Ohio), AVERY® MPI 3000 vinyl (Avery Dennison), 3M CONTROLTAC® IJ40-10 vinyl (3M Europe S.A./N.V. Commercial Graphics, Diegem, Belgium), YUPO® FPU 250 polypropylene film (Yupo Corporation, Tokyo, Japan), DICKSON® Jet210 PVC banner (Dickson Coatings USA, Atlanta Ga.), GATORFOAM® extruded polystyrene foam board (Alcan Inc., Montreal, Canada), KAPA® foam boards (Alcan), SINTRA® foam PVC (Alcan Inc.), PLEXIGLASS® acrylic sheet (Rohm and Haas Company), LEXAN® polycarbonate sheet (SABIC Innovative Plastics, Mt. Vernon, Ind.), and COROPLAST® fluted polypropylene (Coroplast Inc., Dallas Tex.).

The printed image was dried in a temperature-controlled oven for 30 seconds at a temperature of 90° C. The samples were dried until the printed ink was tack and smear free by finger touch. The printed samples were allowed to cool down to room temperature for 1 hr after which the printed samples were tested for abrasion resistance and adhesion according to the above procedures.

The printed samples prepared using the ink composition of this Example 1 were tested for abrasion resistance according to the procedure above. The optical density change after the abrasion resistance test of the ink composition according to Example 1 was from 0% to 3% depending on the substrate tested. Such small decrease in optical density is not considered significant and has little effect on image quality. Thus, the above experiments show that the ink composition of Example 1, which is an example of an ink composition in accordance with the principles described herein, exhibits high abrasion resistance on a variety of substrates.

The samples printed on plastic substrates using the ink composition of this Example 1 were tested for adhesion according to the procedure above. The ink could not be pulled off by the tests on all of the above mentioned substrates, the test results all being classified as 5, which means that the ink composition in accordance with the principles described herein exhibited excellent adhesion to plastic substrates.

Example 2

An ink composition was prepared according to the principles described herein. The ink composition had the composition set forth in Table 2. The total amount (percent by weight) of water in the composition was the amount of water added plus the amount of water from the reagents as supplied by the vendor.

TABLE 2

| Trade name or Abbreviation | Percent by weight | Identity | Percent active substance by weight |
|---|---|---|---|
| Water | 58.25% | | 75.03% |
| DOWANOL ® TPM | 5% | Organic solvent | 100% |
| DOWANOL ® DPG | 7% | Organic solvent | 100% |
| PROGLYDE ® DMM | 3% | Organic solvent | 100% |
| CARBOSET ® CR-763 | 6% | Acrylic latex dispersion | 42% (in water) |
| BAYHYDROL ® UH 2606 | 14% | Polyurethane dispersion | 35% (in water) |
| POLIGEN ® WE1 | 2% | Polyethylene wax emulsion | 35% (in water) |
| ACRYSOL ® RM-5000 | 1.4% | Rheology modifier | 18% (in water) |
| DX 4000 | 0.15% | Surfactant | 36% (in water) |
| BYK ® 028 | 0.2% | Defoamer | 100% |
| HOSTAFINE ® Blue B2G | 3% | Pigment | 40% (in water) |

The ink ingredients of the ink composition were mixed for 1 hour by the DISPERMAT® mixer until a uniform dispersion was achieved. The dispersion was filtered through a 1.2 micron absolute membrane filter. The HAAKE® RS-600 rheometer was used to measure ink viscosity, which was about 10 cp at 20° C. Ink surface tension as measured by the LAUDA® tensiometer was about 27 dyne/cm at room temperature.

The ink was jetted through HP SCITEX® X2 Piezo print head (Hewlett Packard), and the substrate was held by a XY testing platform. Ink jetting reliability was evaluated by first printing an image, in which there are no missing nozzles or any other nozzle failures while printing. The printed nozzle error free print was marked as t=0. Immediately after producing this error free print a time measurement was initiated and a second print following a pre-defined time interval was produced. There was no print head activity during the interval between these two prints. Upon completion of the second print, the printed image was inspected. Pass/fail criterion was decided by assessing nozzle failure at the first pass of the second (in a row) print. If there were more than four nozzles that failed to recover after more than 50 pixels, the result was graded as a failure. The maximum time between two prints without failure is called de-cap time and is used as a metric to describe jetting reliability, the higher the de-cap time the better the reliability.

The ink of Example 2 was jetted onto a substrate and the printed image was tested according to the methods described above. The tests were conducted at room temperature of 24° C. The tested print heads/ink had a maximum de-cap time of 20 seconds.

The ink of Example 2 was further tested at a jetting temperature of 10° C. The tested sample had a maximum decap time (which is a predetermined time period in which the viscosity of the ejectable liquid at the nozzle increases to a threshold, at which ejection fails and the nozzle clogs) of 10 minutes without affecting printed image quality. Therefore, with the low VOC in the ink composition of Example 2, ink jetting reliability is improved significantly by jetting the ink at lower temperatures.

The printed image was dried in a temperature-controlled oven for 10 seconds at a temperature of 90° C. The samples were dried until the printed ink was tack and smear free by finger touch. The printed samples were allowed to cool down to room temperature for 1 hr. Example 2 printed samples were tested using the adhesion and abrasion resistance tests as described above; results similar to those obtained for the ink composition of Example 1 were obtained.

The results obtained in the above experiments demonstrate that the ink compositions of both Example 1 and Example 2 exhibited excellent adhesion and abrasion resistance. In addition, these ink compositions have low organic solvent content, are fast drying and have good jetting reliability.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims. Furthermore, the foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description; they are not intended to be exhaustive or to limit the invention to the precise forms disclosed. Moreover, examples herein are intended to be illustrative only and are presented for discussion purposes and not by way of limitation. Many modifications and variations are possible in view of the above teachings. The embodiments were chosen and described in order to explain the principles of the invention and its practical applications and to thereby enable others skilled in the art to utilize the invention.

What is claimed is:

1. An aqueous inkjet ink composition, comprising:
   (a) at least 60% water by weight,
   (b) an acrylic latex polymer suspension having a glass transition temperature of about 50° C. to about 90° C.,
   (c) a polyurethane suspension,
   (d) a polyethylene wax suspension, and
   (e) an organic solvent that comprises about 10% to about 30% of the ink composition.

2. The ink composition according to claim 1, wherein the acrylic latex polymer suspension is selected from the group consisting of acrylic homopolymers and copolymers of acrylic monomers and vinyl aromatic monomers.

3. The ink composition according to claim 1, wherein the polyurethane suspension has a film formation temperature of about 20° C. to about 50° C., is substantially free from organic solvents, and is selected from the group consisting of aliphatic polyurethane dispersions, aromatic polyurethane dispersions, anionic polyurethane dispersions, non-ionic polyurethane dispersions, aliphatic polyester polyurethane dispersions, aliphatic polycarbonate polyurethane dispersions, aliphatic acrylic modified polyurethane dispersions, aromatic polyester polyurethane dispersions, aromatic polycarbonate polyurethane dispersions, aromatic acrylic modified polyurethane dispersions, aromatic polyester polyurethane dispersions, aromatic polycarbonate polyurethane dispersions, and aromatic acrylic modified polyurethane dispersions.

4. The ink composition according to claim 1, wherein the polyethylene wax suspension is selected from the group consisting of low density polyethylene wax emulsions, high density polyethylene wax emulsions, oxidized polyethylene wax emulsions, ethylene copolymer wax emulsions, and polyethylene copolymer wax emulsions.

5. The ink composition according to claim 1, wherein the organic solvent is selected from the group consisting of glycols, glycol ethers, alcohols, and heterocyclic ketones.

6. The ink composition according to claim 1, wherein acrylic latex polymer solids are present in the ink composition at about 1% to about 4% by weight of the ink composition.

7. The ink composition according to claim 1, wherein polyurethane solids are present in the ink composition at about 2% to about 10% by weight of the ink composition.

8. The ink composition according to claim 1, wherein polyethylene wax solids are present in the ink composition at about 0.1% to about 2% by weight of the ink composition.

9. The ink composition according to claim 1, wherein a ratio of solids in the acrylic latex polymer suspension:polyurethane suspension:polyethylene wax suspension is about 2 to about 3:about 1:about 0.3 to about 0.5.

10. The ink composition according to claim 1, wherein a viscosity of the ink composition is 5 cp to 15 cp at a dispensation temperature of about 5° C. to about 40° C.

11. The ink composition according to claim 1, further comprising one or more colorants.

12. A method of forming a printed substrate, the method comprising ink jetting the aqueous inkjet ink composition according to claim 1 onto a surface of a substrate.

13. The method according to claim 12, wherein the substrate is a plastic substrate.

14. A method of preparing an aqueous inkjet ink composition, the method comprising:
   (a) providing in combination water, an acrylic latex polymer suspension, a polyurethane suspension, a polyethylene wax suspension, and an organic solvent that comprises about 10% to about 30% of the ink composition, wherein the water is greater than about 60% by weight of the combination;
   (b) subjecting the combination to conditions under which the ink composition becomes substantially uniform; and
   (c) subjecting the combination to filtration.

15. The method according to claim 14, wherein acrylic latex polymer solids are present in the ink composition at about 1% to about 4% by weight of the ink composition, polyurethane solids are present in the ink composition at about 2% to about 10% by weight of the ink composition, and polyethylene wax solids are present in the ink composition at about 0.1% to about 2% by weight of the ink composition.

16. The ink composition of claim 10, wherein the viscosity of the ink composition is 5 cp to 15 cp at a dispensation temperature of about 5° C. to about 15° C.

17. A method improving decap performance of an inkjet printhead, comprising jetting the aqueous ink composition of claim 1 from an inkjet printhead at a temperature below room temperature.

18. The method of claim 17, wherein the temperature is from about 5° C. to about 15° C.

19. The method of claim 17, wherein the decap performance as measured by time is increased compared to the decap time at room temperature.

20. The method of claim 19, wherein the decap performance measured by time is increased by at least 30 fold.

* * * * *